(12) United States Patent
Acharya et al.

(10) Patent No.: US 11,599,511 B2
(45) Date of Patent: *Mar. 7, 2023

(54) PROXY BASED BACKUP AND RESTORE OF HYPER-V CLUSTER SHARED VOLUMES (CSV)

(71) Applicant: EMC IP Holding Company LLC, Hopkinton, MA (US)

(72) Inventors: Soumen Acharya, Bangalore (IN); Sunil Yadav, Bangalore (IN); Upanshu Singhal, Bangalore (IN); Poornima Ramu, Bangalore (IN); Suman Tokuri, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 387 days.

This patent is subject to a terminal disclaimer.

(21) Appl. No.: 16/789,160

(22) Filed: Feb. 12, 2020

(65) Prior Publication Data

US 2020/0183894 A1 Jun. 11, 2020

Related U.S. Application Data

(63) Continuation of application No. 14/034,893, filed on Sep. 24, 2013, now Pat. No. 10,614,047.

(51) Int. Cl.
*G06F 16/21* (2019.01)
(52) U.S. Cl.
CPC .................................. *G06F 16/21* (2019.01)

(58) Field of Classification Search
None
See application file for complete search history.

(56) References Cited

U.S. PATENT DOCUMENTS

| | | | |
|---|---|---|---|
| 6,260,061 B1 | 7/2001 | Krishnan et al. |
| 7,389,313 B1 | 6/2008 | Hsieh et al. |
| 7,774,391 B1 | 8/2010 | Le et al. |
| 8,225,057 B1 | 7/2012 | Zheng et al. |
| 8,412,672 B1 | 4/2013 | Radhakrishnan et al. |

(Continued)

OTHER PUBLICATIONS

U.S. Appl. No. 14/034,893, filed Jul. 9, 2015, Office Action.

(Continued)

*Primary Examiner* — Amresh Singh
(74) *Attorney, Agent, or Firm* — Workman Nydegger

(57) ABSTRACT

In one example, a method includes obtaining cluster and machine configuration information, sending a restore request for one or more machines, and loading a backup of a virtual machine, the backup having been created by a federated backup process involving the physical proxy node, and the virtual machine includes data that resides on a virtual federated database that is an element of a cluster environment and to which respective databases of each of a plurality of nodes of the cluster environment are mapped. Next, the virtual machine is taken offline after the backup of the virtual machine has been loaded, and after the virtual machine has been taken offline, the virtual machine is removed from the node where it resides. The backup of the virtual machine is then restored, and the restored virtual machine brought online, after which the restored virtual machine is enabled as a cluster-wide virtual machine.

16 Claims, 7 Drawing Sheets

(56) References Cited

U.S. PATENT DOCUMENTS

| | | |
|---|---|---|
| 8,473,463 B1 | 6/2013 | Wilk |
| 8,856,337 B2 | 10/2014 | Otani |
| 8,930,333 B1 | 1/2015 | Prince et al. |
| 8,930,539 B1 | 1/2015 | Rajaa |
| 9,003,141 B2 | 4/2015 | Nielsen et al. |
| 9,201,887 B1 | 12/2015 | Earl et al. |
| 9,329,941 B2 | 5/2016 | Liu et al. |
| 9,398,092 B1 | 7/2016 | Singhal et al. |
| 9,424,152 B1 * | 8/2016 | Raut .................. G06F 11/2041 |
| 9,501,544 B1 | 11/2016 | Singhal et al. |
| 9,575,798 B2 | 2/2017 | Terayama et al. |
| 2003/0154236 A1 | 8/2003 | Dar et al. |
| 2003/0212716 A1 | 11/2003 | Steele et al. |
| 2007/0214196 A1 | 9/2007 | Garimella et al. |
| 2007/0233828 A1 | 10/2007 | Gilbert |
| 2008/0046400 A1 | 2/2008 | Shi et al. |
| 2008/0189700 A1 | 8/2008 | Schmidt et al. |
| 2008/0243954 A1 | 10/2008 | Augenstein et al. |
| 2008/0270363 A1 | 10/2008 | Hunt et al. |
| 2009/0222496 A1 | 9/2009 | Liu et al. |
| 2009/0300080 A1 | 12/2009 | Stringham |
| 2011/0126197 A1 | 5/2011 | Larsen et al. |
| 2011/0251992 A1 | 10/2011 | Bethlehem et al. |
| 2012/0066487 A1 | 3/2012 | Larsen et al. |
| 2012/0101998 A1 | 4/2012 | Cahill et al. |
| 2012/0109958 A1 | 5/2012 | Thakur et al. |
| 2012/0150805 A1 * | 6/2012 | Pafumi ............... G06F 11/1464 707/E17.007 |
| 2012/0150815 A1 | 6/2012 | Pafumi et al. |
| 2012/0150969 A1 | 6/2012 | Reed et al. |
| 2012/0158806 A1 | 6/2012 | Snyder et al. |
| 2012/0290630 A1 | 11/2012 | Aizman et al. |
| 2012/0304191 A1 | 11/2012 | Morgan |
| 2012/0330898 A1 | 12/2012 | Bk et al. |
| 2013/0085995 A1 | 4/2013 | Mostachetti et al. |
| 2013/0086000 A1 | 4/2013 | Mostachetti et al. |
| 2013/0124807 A1 | 5/2013 | Nielsen et al. |
| 2013/0185409 A1 | 7/2013 | Zeng et al. |
| 2013/0204849 A1 | 8/2013 | Chacko |
| 2013/0238562 A1 | 9/2013 | Kumarasamy et al. |
| 2013/0247034 A1 | 9/2013 | Messerli |
| 2013/0326260 A1 | 12/2013 | Wei et al. |
| 2013/0332770 A1 | 12/2013 | Thiel et al. |
| 2014/0095817 A1 | 4/2014 | Hsu et al. |
| 2014/0108474 A1 | 4/2014 | David et al. |
| 2014/0149356 A1 | 5/2014 | Agarwal et al. |
| 2014/0280961 A1 | 9/2014 | Martinez et al. |
| 2015/0039764 A1 | 2/2015 | Beloglazov |

OTHER PUBLICATIONS

U.S. Appl. No. 14/034,893, filed Nov. 6, 2015, Final Office Action.
U.S. Appl. No. 14/034,893, filed Mar. 10, 2016, Office Action.
U.S. Appl. No. 14/034,893, filed Jun. 23, 2016, Final Office Action.
U.S. Appl. No. 14/034,893, filed Jun. 9, 2017, Office Action.
U.S. Appl. No. 14/034,893, filed Nov. 16, 2017, Final Office Action.
U.S. Appl. No. 14/034,893, filed Feb. 1, 2018, Office Action.
U.S. Appl. No. 14/034,893, filed Jun. 26, 2018, Final Office Action.
U.S. Appl. No. 14/034,893, filed Nov. 21, 2018, Office Action.
U.S. Appl. No. 14/034,893, filed Jun. 13, 2019, Final Office Action.
U.S. Appl. No. 14/034,893, filed Dec. 2, 2019, Notice of Allowance.

* cited by examiner

PROXY BASED BACKUP AND RESTORE OF HYPER-V CLUSTER SHARED VOLUMES (CSV)

FIELD OF THE INVENTION

Embodiments of the present invention generally concern backing up and restoring data. More particularly, embodiments of the invention relate to systems, hardware, computer-readable media, and methods for backing up and/or restoring data associated with applications that run in clustered environments.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

Systems, hardware, computer-readable media, and methods for backing up and/or restoring data may vary depending upon the nature of the computing environment in which associated applications are operating. For example, methods for backing up and restoring data generated in connection with applications running in stand-alone environments may be quite different from methods for backing up and restoring data generated in connection with applications running in clustered environments. Correspondingly, the challenges presented by operating in such environments may be different as well, and clustered environments, in particular, present some unique challenges to the backup and restoration of data.

To briefly illustrate, federated backup and restore functionality may be useful in helping to provide application-specific backup and restore operations, while also helping to ensure that backup and restore operations in a cluster environment do not impair the operation of production servers. However, an entity may prefer not to install a backup agent on every server in the cluster environment. Moreover, the entity may wish to be able to designate a particular server, or servers, in the cluster environment to be dedicated to backup and restore operations.

In light of the foregoing, it would be helpful to avoid the need to install a backup agent on all of the servers in a cluster environment. Likewise, it would be desirable for an entity to have some flexibility in terms of designating a particular server, or servers, to perform backup and/or restore operations for one or more applications operating in a cluster environment.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
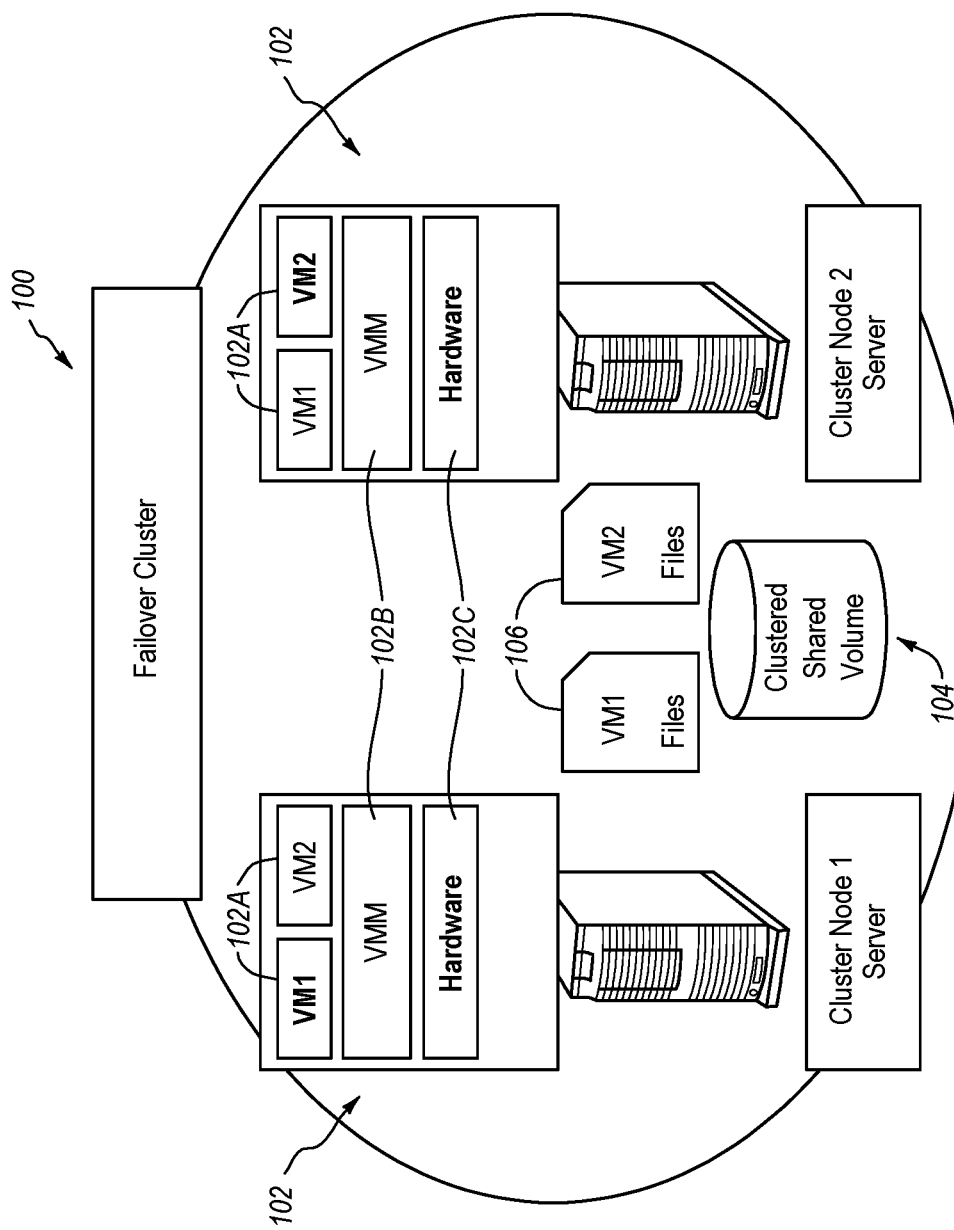
FIG. 1 is directed to aspects of an example operating environment for at least some embodiments of the invention.

Embodiments of the present invention generally concern backing up and restoring data. At least some embodiments are employed in clustered environments. More particular example embodiments of the invention relate to systems, hardware, computer-readable media and methods for backing up and/or restoring data associated with applications that run in clustered environments. These and/or other embodiments may be particularly well suited for use with federated backup and/or restore systems, hardware, computer-readable media and methods.

In at least some embodiments, one or more applications are installed and running in a cluster environment that includes a plurality of nodes, where one or more of the nodes may include, or constitute, a server. The applications may generate and/or cause the generation of data that is desired to be backed up and, if necessary or desired, restored to one or more locations, physical or virtual machines, or environments, for example.

Prior to, or in connection with, a backup process to be performed in a cluster environment, a user, such as a system administrator for example, can specify a particular node in the cluster as a proxy for performing the backup of data generated by and/or in connection with one or more of the applications in the cluster environment. A prioritized list of nodes may be employed and the backup can be performed by the first available node. In at least some embodiments, a default backup node may be defined although, if desired, a user may override the default and select an alternative node in the cluster for performing the backup. In the event that none of the desired nodes are available for backup, the node to which the cluster server name is resolved can be used.

For a restoration process to be performed in a cluster environment in connection with backup data such as that described herein, a default restore node may be defined although, if desired, a user may override the default and select an alternative node in the cluster as a proxy for performing the restore. The restore node selection process can be facilitated by way of a graphical user interface (GUI) running on a node of the cluster. Once the restore node has been selected, whether by default or by a user, the restoration of the backup data to one or more targets, such as a physical and/or virtual machine, can be performed.

As may be evident from the preceding discussion, and other disclosure herein, embodiments of the invention may provide various advantages, although it is not necessary, or required, that any particular embodiment(s) provide any particular advantage(s). Moreover, and consistent with the foregoing, embodiments within the scope of one or more claims may additionally, or alternatively, provide one or more advantages not specifically enumerated herein. Finally, to the extent that possible advantages are enumerated herein, those may be present in one or more embodiments in any combination.

At least some embodiments of the invention may enable backup and/or restoration of application data in a cluster environment, and may be particularly useful in connection with federated backup and/or restore operations. As well, users may have the latitude to select any desired node for the backup process, and/or for the restoration process, although default nodes for either or both can alternatively be defined. Finally, at least some embodiments of the invention may obviate the need to install a backup and/or restore agent on every node in the cluster where the applications are running.

A. Example Operating Environments

In general, embodiments of the invention may include and/or be implemented in a cluster environment that includes a plurality of nodes. In some embodiments, the cluster environment comprises a Windows® Hyper-V Failover Cluster, although that is not required. One or more of the nodes can take the form of a server, such as a Windows® Hyper-V server for example, and/or other elements. One or more applications may be hosted by one or more of the nodes of the cluster environment, and the applications may generate and/or cause the generation of data that is desired to be backed up and restored. For example, one, some, or all of the nodes in the cluster may host one or more virtual machines (VM), each of which may be running various applications. In at least some embodiments, the VMs may be created and run by a hypervisor, also sometimes referred to as a virtual machine monitor (VMM), although use of a VMM is not required. The VMM, when present, can take the form of software, firmware, or hardware, or combinations of any of those.

The cluster environment may also include a disk or disks having one or more volumes that are accessible for read and write operations, also sometimes referred to as I/O operations, by all of the nodes within the cluster environment. One example of such a shared disk is a Cluster Shared Volume (CSV) such as is employed in connection with Microsoft® Windows® Server applications such as the Microsoft® Windows® Server 2012 Hyper-V application. The CSV includes a Windows® NT File System (NTFS) volume that is accessible by all nodes within an associated Windows Server Failover Cluster. Multiple CSVs, or other disks, can be employed in a single cluster environment. It should be noted that the scope of the invention is not limited to the use of CSVs, nor to Windows® Server applications, and other shared disk configurations and/or other applications can alternatively be employed in other embodiments.

As the nodes in a cluster environment may each operate autonomously, and in connection with different respective databases, federated backup and restore applications and methods are employed in at least some embodiments. In general, a federated approach to database management involves the mapping of a plurality of different databases, such as the respective databases of the nodes in the cluster environment for example, into a single federated database, one example of which is a CSV, although other types of shared disks can alternatively be used. Because the federated database is virtual, all users in the cluster environment have access to all cluster data, and the integrity of each individual database is maintained.

A variety of different backup and recovery applications can be used for federated backup and restoration processes. One example of such a backup and recovery application is the EMC NetWorker backup and restore application (NW), although other backup and restore applications can alternatively be employed in connection with one or more embodiments of the invention. In one particular example embodiment, the Network Module for Microsoft (NMM), a Microsoft-specific NetWorker module, is employed for backup and restoration, although the scope of the invention is not limited to the use or implementation of either NetWorker or NMM. Finally, in at least some embodiments, the backup and restore application is hosted by a node, such as a server, that is not a part of the cluster environment, though such an arrangement is not required.

With the foregoing in mind, attention is directed now to FIG. 1 which discloses aspects of an example operating environment 100. In general, the operating environment 100 includes a plurality of nodes 102, each of which can access one or more shared disks 104 that store data 106 from one or more of the nodes 102, where such data 106 may include one or more of application data, system and other files, operating systems, file directories, and objects. While the example of FIG. 1 indicates two nodes 102, the operating environment 100 can include any number of nodes, including three, or more, nodes. As well, the shared disks 104 may be virtual disks, physical disks, or a combination of virtual and physical disks.

One, some, or all of the nodes 102 may comprise a server. One, some, or all of the nodes 102 may include a plurality of virtual machines (VM) 102A created and/or run by a virtual machine monitor (VMM) 102B. As well, one or more of the nodes 102 may include hardware 102C such as disk drives, processors, computer readable media carrying executable instructions for one or more applications, wireless and/or hardwired communication hardware, RAM, ROM, flash memory, I/O devices, data storage elements, or any combination of the foregoing.

In some more particular embodiments, the operating environment 100 comprises a Hyper-V Failover Cluster, one or more of the nodes 102 comprise a Windows® Server 2012 Hyper-V server, and/or the shared disk 104 comprises one or more CSVs, although none of the foregoing particular implementations are required to be employed.

Finally, the operating environment 100 may comprise or constitute a cloud computing environment. For example, one or more nodes 102 may comprise elements of a cloud computing environment.

B. Example System Configuration—Backup

Figure 2:
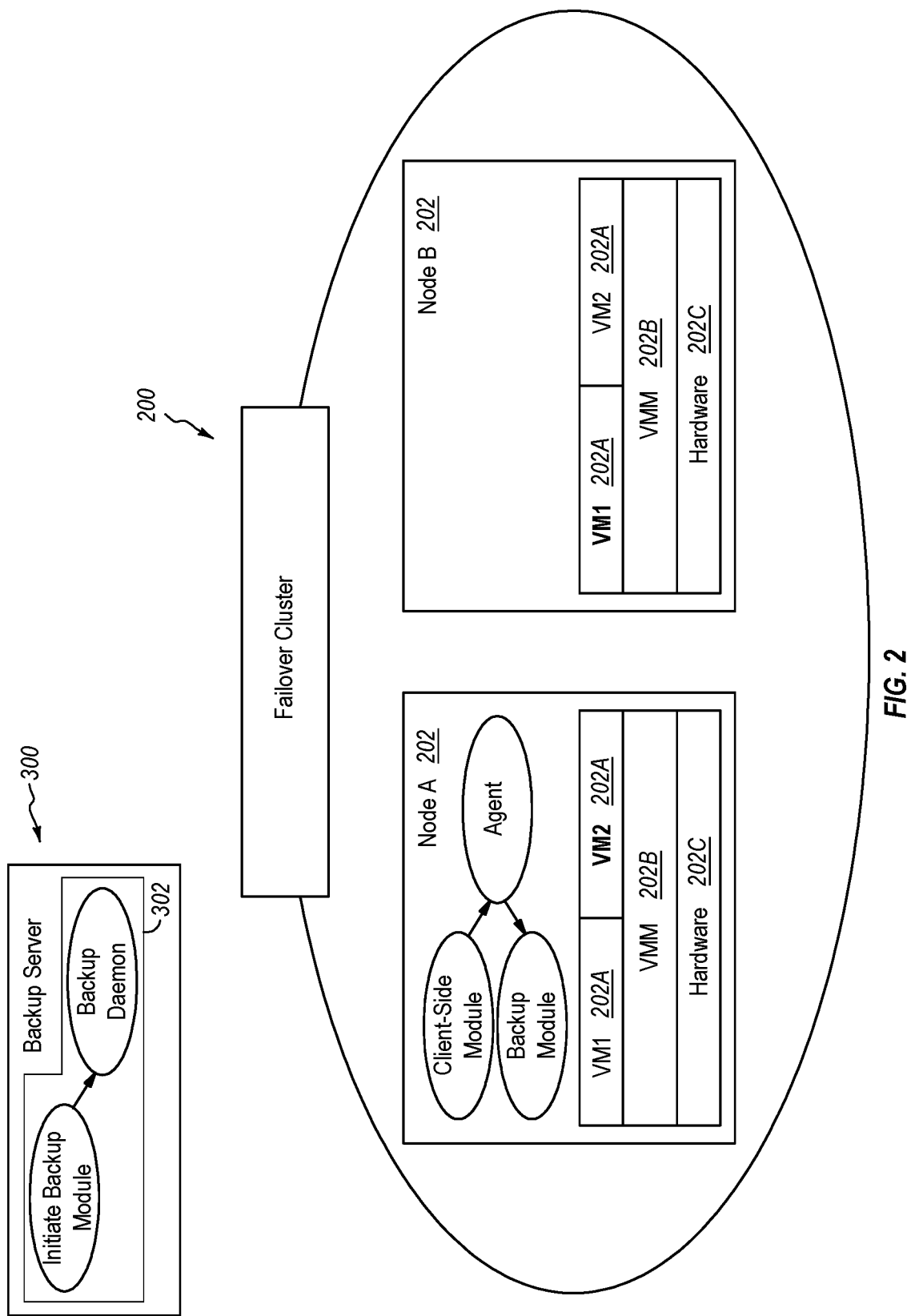
FIG. 2 discloses an example of a backup and restore configuration.

With reference now to FIG. 2, and continued attention to FIG. 1, details are provided concerning an example system configuration in connection with which a backup process, such as a federated backup process for example, may be performed. Except as may be noted elsewhere herein, the operating environment 200 of FIG. 2 may be the same, or identical, to the operating environment disclosed in FIG. 1 and, accordingly, the discussion of FIG. 1 is applicable as well to FIG. 2. As indicated in FIG. 2, the operating environment 200 may include a plurality of nodes 202, designated "Node A" and "Node B" in the example of FIG. 2. One or more of the nodes 202 can include one or more VMs 202A and a VMM 202B. As well, one or more of the nodes 202 may include hardware 202C. While one or more of the nodes 202, like nodes 102, can be identically configured, that is not required. As in the case of the operating environment 100, the operating environment 200 may operate in connection with one or more shared disks (not shown in FIG. 2), such as CSVs for example.

Moreover, the operating environment 200 may comprise or constitute a cloud computing environment. For example, one or more nodes 202 may comprise elements of a cloud computing environment.

As further disclosed in FIG. 2, a backup and restore server 300 is arranged to coordinate with one of the nodes 202 to back up one or more shared disks (not shown in FIG. 2) of the operating environment 200. In the example of FIG. 2, the backup and restore server 300 is located remotely from the operating environment 200.

In general, the backup and restore server 300 may host a backup and restore application 302 operable to perform a federated backup of the operating environment 200, or operating environment 100, by backing up one more shared disks associated with the operating environment. In one example embodiment, the backup and restore server 300 is an EMC NetWorker server running the NetWorker application, although any other suitable applications can alternatively be employed. Where the EMC NetWorker application is utilized, a module such as the Network Module for Microsoft (NMM) may be employed for backup and restore procedures, although that is not required.

Figure 3:
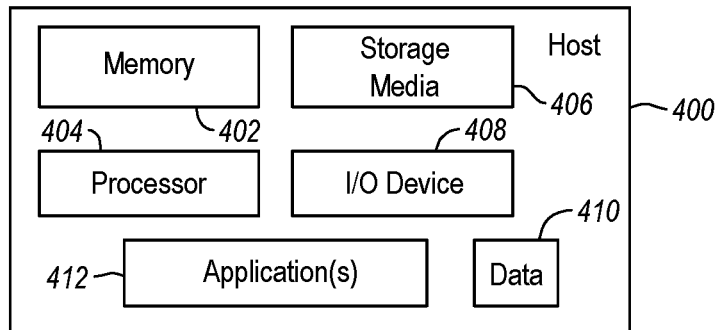
FIG. 3 discloses an example of a server running a backup and restore application.

With reference now to FIG. 3, one example of a host 400, in the form of a backup and restore server for example, and associated hardware is disclosed. The host 400 can comprise any of a variety of host types including, by way of example only, servers (e.g., a file server, an email server, or any other type of server), computers (e.g., desktop computers, laptop computers, tablet devices, smartphones), virtual machines, databases, or any combination thereof.

In the example of FIG. 3, the host 400 is a machine, such as a computing device, that includes a memory 402, one or more processors 404, storage media 406, I/O device 408, and data storage 410. As well, one or more applications 412, such as a backup and restore application for example, are provided that comprise executable instructions. One or more nodes of an operating environment, such as the operating environments 100 and 200 for example, may be configured similarly, or identically, to the host 400.

C. Example Backup Process

Figure 4:
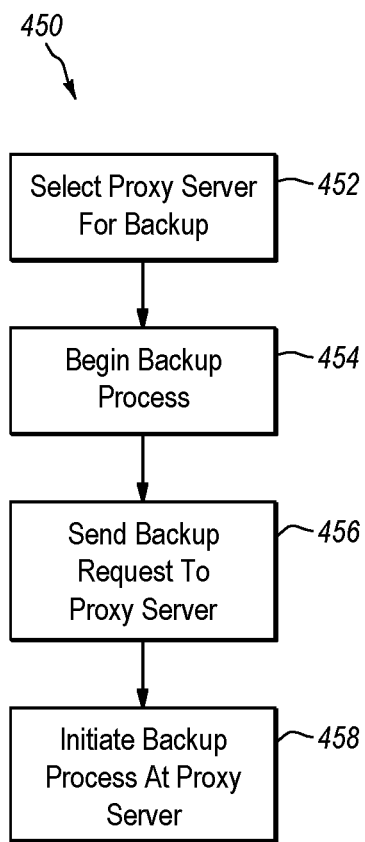
FIG. 4 discloses aspects of an example method for performing a proxy based backup in a cluster environment.

Turning now to FIG. 4, details are disclosed concerning aspects of an example method 450 for performing a proxy based backup in a cluster environment. The method 450 begins at 452 where a proxy server is selected for the backup. Selection of the proxy server can be effected manually, or automatically. In the latter case, the proxy server can be set to a user-defined, or other, default. In one example of a manual selection process, a user, such as an administrator for example, can specify a preferred server order list, which may also be referred to as a PSOL.

Where a PSOL is employed, the backup will be performed from the first available server in the list. If none of the servers in the list are available, the backup may be performed from the node to which 'Cluster Server Name' is resolved. The PSOL can be defined, for example, as application information in the client resource of 'Cluster Server Name' thus: NSR_FEDERATED_PSOL=server1, server2, server3. The PSOL can be defined in any other suitable fashion however, and the scope of the invention is not limited to the foregoing example.

One useful aspect that may be realized by the aforementioned proxy server approaches, discussed in more detail below, is that there is no need for a backup agent to be installed on each of the servers in the cluster. Instead, the proxy server can be simply defined by default, or specified on an as-needed basis by a user. These approaches can reduce, or eliminate, the need to impose a backup processing load on production servers in the cluster.

After a proxy server for the backup has been selected, the method 450 proceeds to 454 where the data backup process begins. As used herein, the term 'data' is intended to be broadly construed and includes, but is not limited to, application data, system and other files, operating systems, file directories, file systems, objects, virtual machines, and shared disks such as CSVs. In some embodiments, a command such as the 'savegrp' command used in connection with EMC NetWorker can be used to identify, and initiate the backup of, the data of interest.

At 456, a backup request is generated and sent to the proxy server that was selected to perform the backup. The backup request can then be used to initiate the backup. These processes can be implemented in a variety of ways, one example of which follows.

With reference to the particular example of NetWorker, the 'savegrp' command uses the 'nsrjobd' daemon, a NetWorker server daemon, to start the backup of the identified data. More specifically, the nsrjobd' daemon uses a client side module, such as 'nsrexecd' for example, for remote execution of the job request, that is, the backup of the identified data. The 'nsrexecd' resides on the proxy server that is to perform the backup, the Cluster Server Client in this illustrative example. While this illustrative example employs a daemon, any other structure, device, code, program, or combination of the foregoing, can alternatively be employed.

After the backup request has been received at the proxy server, the process 450 advances to 458 where a backup process identified by the backup request is initiated at the proxy server. The foregoing can be implemented in a variety of ways, one example of which follows.

With continued reference to the NetWorker example, the client side 'nsrexecd' forwards a job request, received from the 'nsrjobd' daemon, to a snapshot agent 'nsrsnap' for further processing. In particular, the snapshot agent 'nsrsnap' can initiate the NMM nsrsnap_vss_save program as a primary backup process. This primary process then begins a secondary nsrsnap_vss_save process on the proxy server that was selected to perform the backup. This secondary process invokes Hyper-V and CSV VSS (Volume Shadow Copy Service) writers to determine virtual machines and cluster shared volumes to be backed up, and then performs the backup. Specifically, Hyper-V uses the VSS to backup and restore virtual machines. The backup can be stored in any suitable location. In at least some embodiments, the backup is stored at the proxy server that performed the backup process, although the backup could be stored in additional, or alternative, locations as well.

D. Example System Configuration—Restore

Figure 5:
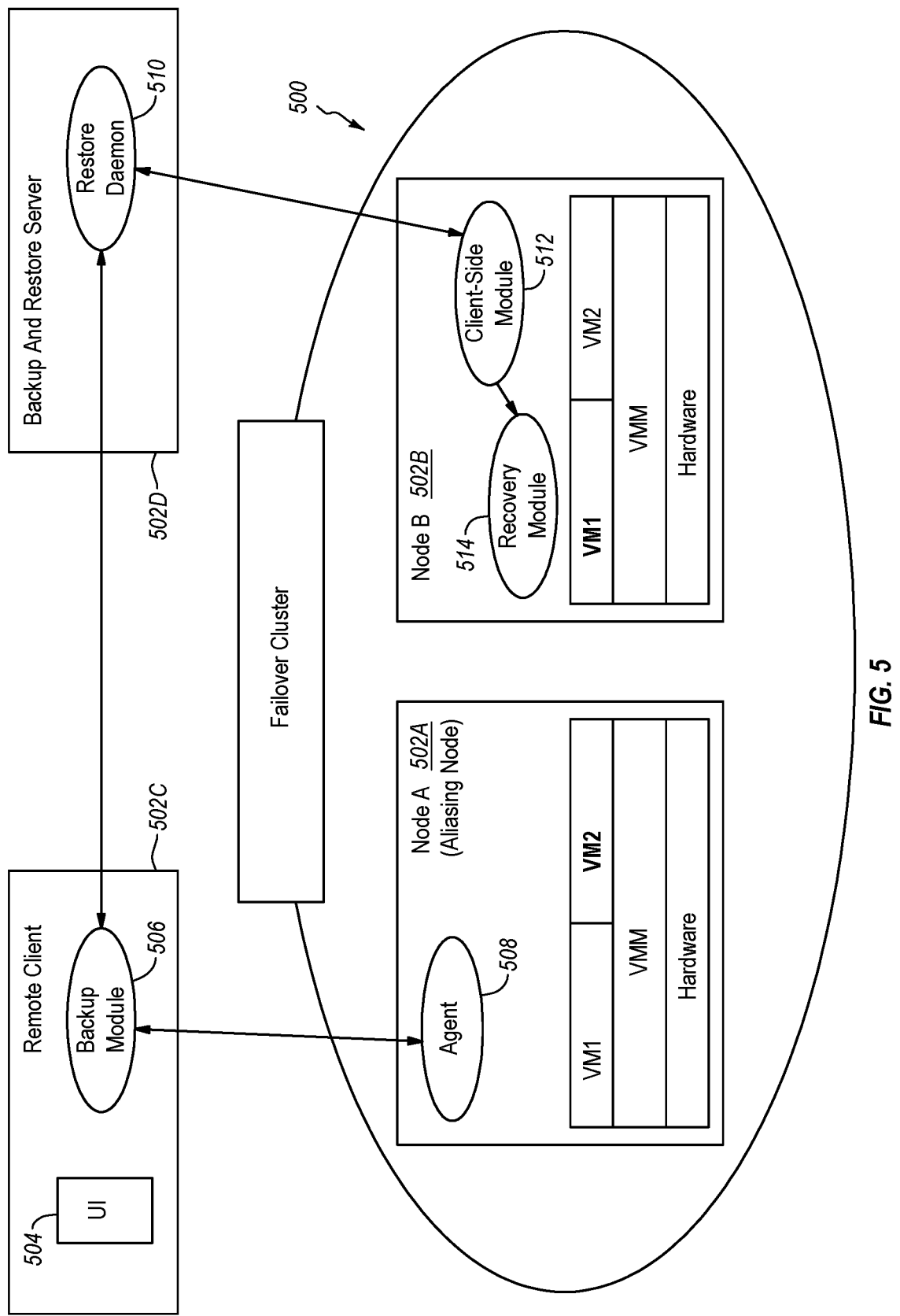
FIG. 5 discloses aspects of an example system configuration in connection with which a restore process may be performed.

In general, a restore operation within the scope of the present invention can be initiated either on a node in a cluster environment, or on a node, such as a client for example, outside of the cluster environment. Turning now to FIG. 5, details are disclosed concerning aspects of an example system configuration in connection with which a restore process may be performed. In the example of FIG. 5, a restore process can be initiated on a node outside of the cluster environment. In general, the operating environment 500 may be substantially the same as the operating environment 200 or operating environment 100. Accordingly, only certain distinctions between the operating environment 500 and operating environments 100 and 200 are addressed below.

Similar to the operating environment 200 and the operating environment 100, the operating environment 500 may comprise a cluster environment that includes a plurality of nodes, such as nodes 502A and 502B for example. As indicated in the example of FIG. 5, nodes 502A and 502B are both server cores. As such, it may not be possible or desirable, in some circumstances at least, to initiate a restore process from those cluster nodes. Of course, other arrangements can be employed where one or more nodes of a cluster environment do not comprise server cores. Moreover, the operating environment 500 may comprise or constitute a cloud computing environment. For example, one or more of the nodes 502A and 502B may comprise elements of a cloud computing environment.

In addition to the nodes 502A and 502B, the operating environment 500 may include one or more external nodes 502C, such as a remote client for example, and external node 502D, such as a backup and restore server for example. The external node 502C may include a user interface (UI) 504 that can be used by an administrator or other user to initiate a cluster level restore operation. In one example embodiment, the UI 504 is a NMM UI, an example of which is disclosed in FIG. 6, discussed below.

In addition to the UI 504, the external node 502C includes a module 506, such as plug-in, that is operable to implement and/or cause the implementation of, among other things, one or more desired backup policies. One example of such a plug-in is the HyperVPlugIn, although alternative plug-ins and modules can be employed. Node 502A, which may comprise an aliasing node, includes an agent 508 that operates at the direction of the module 506. In the example embodiment where the module 506 is implemented as the HyperVPlugIn, the agent 508 may comprise the Hyper-V agent 'nmcsc.'

With continued reference to FIG. 5, the external node 502D may include a module 510, such as the 'nsrjobd' daemon for example, that cooperates with the module 506 and a module 512, such as 'nsrexecd' for example, to facilitate one or more aspects of a restore process, as discussed in further detail elsewhere herein. As well, the external node 502D may include a recovery module 514. Where restore operations are performed in a Hyper-V CSV environment, the recovery module 514 may comprise the 'nsrsnap_vss_recov' program.

Figure 6:
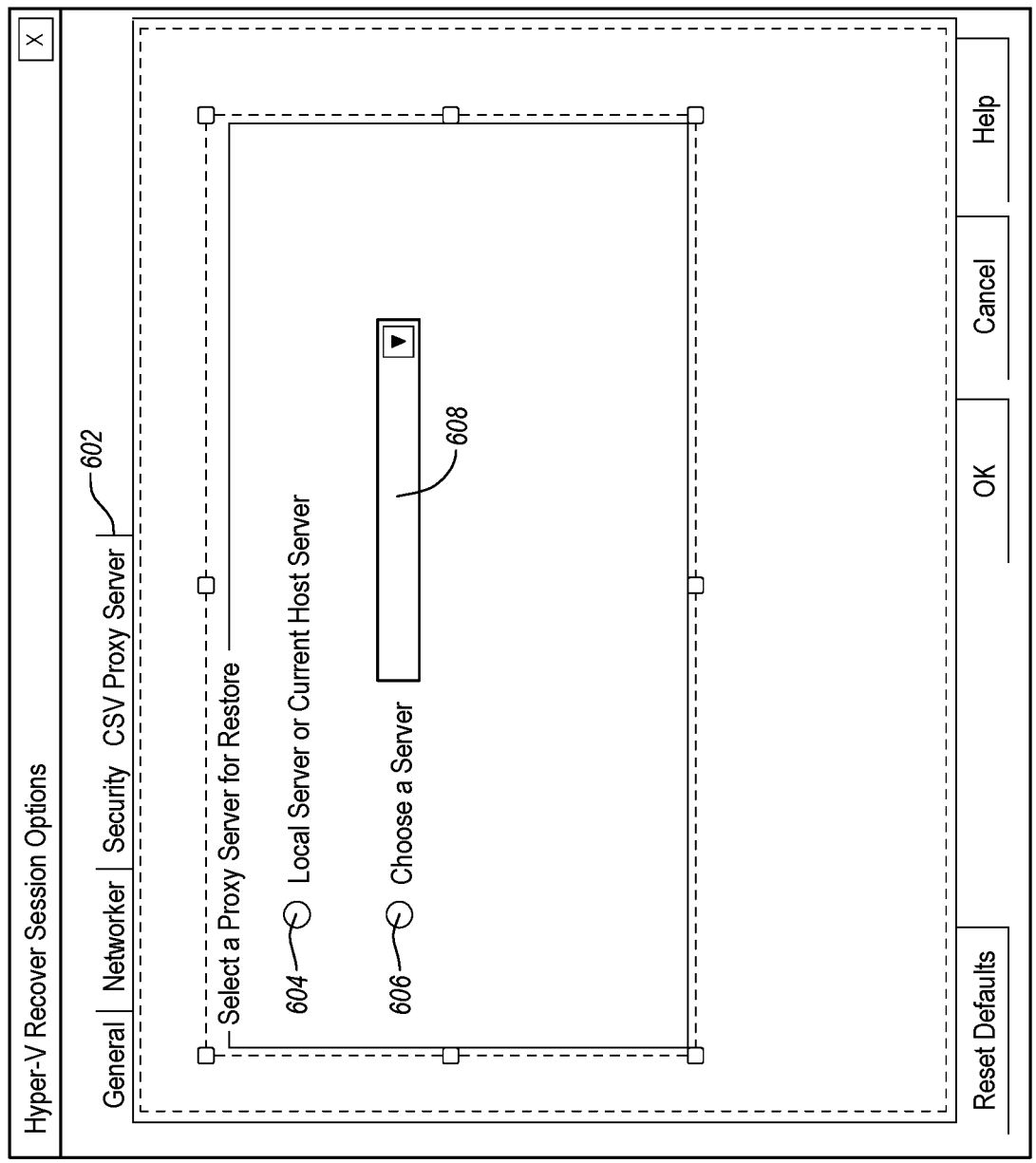
FIG. 6 discloses aspects of an example UI that may be employed to identify a proxy server for backup and/or restore operations.

Turning now to FIG. 6, details are provided concerning an example of UI 600 that may be used in the selection of proxy server for a restore operation. While the example disclosed in FIG. 6 is specific to the Hyper-V environment, it should be understood that various other forms of a UI may be employed, and the scope of the invention is not limited to the particular example of FIG. 6. As discussed in more detail elsewhere herein, the UI 600 can be invoked on a node within a cluster environment or, alternatively, on a node that is not part of that cluster environment.

The UI 600 includes a proxy server tab 602 that, when selected by a user, enables the user to select a proxy server for a restore operation. In particular, a radio button 604 enables a user to specify a local server, or current host server, for the recovery operation. Alternatively, a user may employ a radio button 606 to choose a specific server from a drop-down list 608.

E. Example Restore Process

Figure 7:
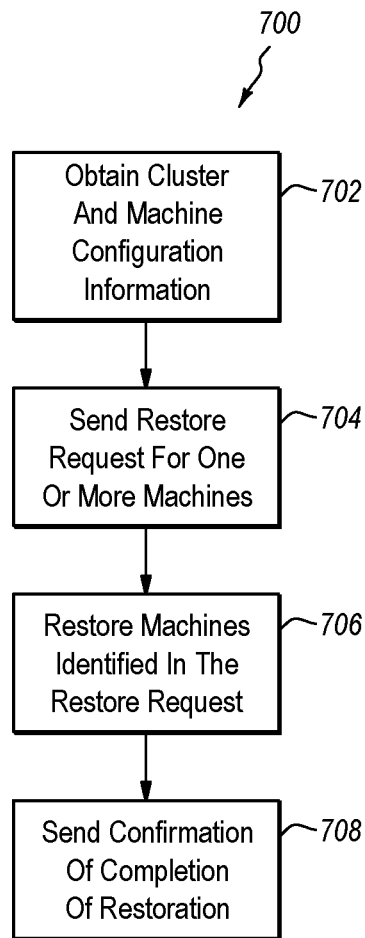
FIG. 7 discloses aspects of an example method for performing a proxy based restore process in a cluster environment.

Turning now to FIG. 7, and with continuing reference to FIG. 5, details are disclosed concerning aspects of an example method 700 for performing a proxy based restore process in a cluster environment. In general, FIG. 7 is directed to an example method for restoring one or more machines, where the restore process is initiated on a client or other node outside a cluster environment.

The method 700 begins at 702 where information is obtained concerning the configuration of the cluster environment and the configuration of the machine or machines, such as VMs, that are to be restored. This process can be performed in a variety of ways, one example of which is discussed below.

In particular, and with reference to the example of the Hyper-V CSV environment, a user may start an NMM UI on a remote client that is outside the cluster environment and, using the UI, navigate to the HyperVPlugIn on that client, and commence a restore process, such as a cluster level restore process. If, on the other hand, the NMM UI is started on a node that is in the cluster environment, that node will become the default node for restore operations. That is, nsrsnap_vss_recov.exe is spawned on the local host in this scenario.

Once the user has navigated to the HyperVPlugIn, the HyperVPlugIn connects to a corresponding agent, such as the Hyper-V agent 'nmcsc,' located on a cluster aliasing node and obtains cluster and VM configuration information from the agent.

As part of this initial process, the user may select a proxy node in the cluster on which restore operations will be performed. This selection may be facilitated by a UI such as is disclosed in FIG. 6. The proxy node in this particular example is the node on which nsrsnap_vss_recov.exe will be spawned. As noted elsewhere herein, the proxy node for a restore operation can be set by default. In one default scenario, nsrsnap_vss_recov.exe is spawned on the aliasing node (see, e.g., FIG. 5) that is, the node to which 'Cluster Server Name' resolves.

With continued reference now to FIG. 7, a restore request that includes a restore command for one or more machines, such as VMs, on a node of the cluster environment is sent 704. In one example implementation, this job request is sent from a remote client outside the cluster environment to a backup and restore server that is also outside the cluster environment. In the context of a Hyper-V CSV environment, this process comprises the use of the HyperVPlugIn to send a restore command for one or more VMs to 'nsrjobd' on a backup and restore server.

The restore request is then executed 706. In particular, the machine(s) identified in the restore request are restored. In some embodiments, the handling and execution of the restore request may involve first sending the restore request from a backup and restore server to a module, such as a client side module 'nsrexecd' for example, on the proxy server that is to perform the restore process. The client side module may then forward the restore request to a recovery program on the proxy server, and the recovery program then restores the machine(s) identified in the recovery request. One particular implementation of the execution 706 of a restore request is addressed below in the discussion of FIG. 8.

Finally, confirmation that the restore process has been completed is sent 708. In some embodiments, this confirmation is sent from the backup and restore server to the remote client from which the restore process was initiated.

F. Execution of Restore Request in Restore Process

Figure 8:
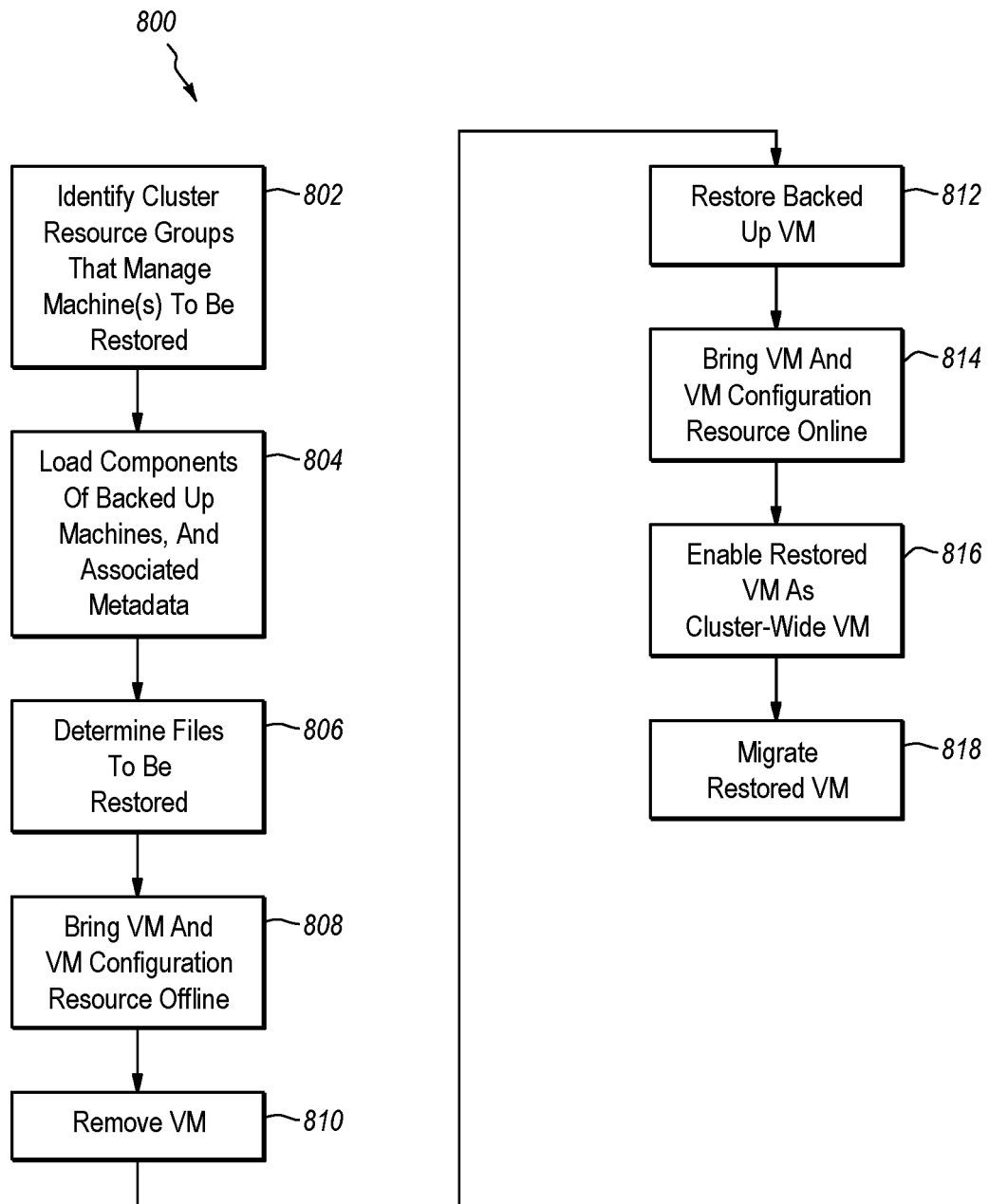
FIG. 8 discloses aspects of an example method for executing a restore request.

Turning now to FIG. 8, and with continued reference to FIG. 5, details are disclosed concerning aspects of an example method 800 for executing a restore request, such as the restore execution process 706 that may occur in connection with a restore process exemplified by method 700. In general, the method 800 concerns processes performed by, or at least in association with, the recover program nsrsnap_vss_recov.exe, which may be spawned, and reside, on an aliasing node. Any other suitable recover program(s) can alternatively be employed however.

In some embodiments, a Hyper-V VSS Writer is invoked prior to, or as part of, the method 800. The Hyper-V VSS Writer may use an infrastructure such as Windows Management Instrumentation (WMI) to obtain management and other data concerning the restore operation, and/or WMI can be used to perform elements of the restore operation.

The example method 800 begins at 802 where the cluster resource groups that manage the machines, such as VMs, to be restored are identified. Next, the components of the backed up machines, and any Hyper-V VSS Writer metadata are loaded 804, and the files to be restored are determined 806. This determination may be made, for example, by interfacing with the Hyper-V VSS Writer or WMI.

The VM(s) to be restored, and the VM configuration resources are then brought offline 808. In some embodiments, this may be accomplished, for example, through the use of one or more cluster application program interfaces (API). Next, the offline VM(s), if any exist, are removed 810 from the node where the restoration is to occur.

Once the VM(s) are removed, the node is then ready for restoration of the backed up VM(s). Accordingly, the backed up VMs are then restored 812 to the node. In some embodiments, this may be accomplished, for example, by interfacing with the Hyper-V VSS Writer or WMI. Where the Hyper-V VSS Writer is employed, restoration of the VM(s) will bring up the VM(s) in the Hyper-V Manager to enable further processing, if desired, of those VM(s) using the Hyper-V Manager.

Once the VM(s) have been restored to the target node, the restored VM(s) and the VM configuration resources can then be brought online 814. WMI APIs or comparable mechanisms are then used to enable the restored VM(s) to serve as cluster-wide VM(s) 816. Finally, one or more of the restored VM(s) can be migrated 818 to their original nodes if desired and if not already resident there.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   obtaining cluster and virtual machine configuration information;
   sending a restore request for a virtual machine;
   loading a backup of a virtual machine, the backup of the virtual machine having been created by a federated backup process involving a physical proxy node, and the virtual machine comprises data that resides on a virtual federated database that is an element of a cluster environment and to which respective databases of each of a plurality of nodes of the cluster environment are mapped;

taking the virtual machine offline after the backup of the virtual machine has been loaded;
after the virtual machine has been taken offline, removing the virtual machine from a cluster node of the cluster environment where the virtual machines resides;
restoring the virtual machine by restoring the backup of the virtual machine to the cluster node of the cluster environment;
bringing the restored virtual machine online after the backup of the virtual machine has been restored;
after the restored virtual machine has been brought online, enabling the restored virtual machine as a cluster-wide virtual machine; and
sending confirmation that restoration of the virtual machine has been completed.

2. The method as recited in claim 1, wherein obtaining cluster and virtual machine configuration information comprises selecting a proxy node of the cluster environment on which restoration of the virtual machine will be performed.

3. The method as recited in claim 1, wherein the cluster and virtual machine configuration information are obtained from an agent that resides on a cluster aliasing node.

4. The method as recited in claim 1, wherein the restore request is sent from a remote client outside the cluster environment to a backup and restore server outside the cluster environment.

5. The method as recited in claim 1, wherein part of the method is performed by a recover program spawned, and residing, on an aliasing node.

6. The method as recited in claim 1, further comprising identifying a file to be restored.

7. The method as recited in claim 1, further comprising bringing virtual machine configuration resources online along with the restored virtual machine.

8. The method as recited in claim 1, further comprising migrating the restored virtual machine to another node.

9. A non-transitory storage medium having stored therein instructions which are executable by one or more hardware processors to perform operations comprising:
obtaining cluster and virtual machine configuration information;
sending a restore request for a virtual machine;
loading a backup of a virtual machine, the backup of the virtual machine having been created by a federated backup process involving a physical proxy node, and the virtual machine comprises data that resides on a virtual federated database that is an element of a cluster environment and to which respective databases of each of a plurality of nodes of the cluster environment are mapped;
taking the virtual machine offline after the backup of the virtual machine has been loaded;
after the virtual machine has been taken offline, removing the virtual machine from a cluster node of the cluster environment where the virtual machines resides;
restoring the virtual machine by restoring the backup of the virtual machine to the cluster node of the cluster environment;
bringing the restored virtual machine online after the backup of the virtual machine has been restored;
after the restored virtual machine has been brought online, enabling the restored virtual machine as a cluster-wide virtual machine; and
sending confirmation that restoration of the virtual machine has been completed.

10. The non-transitory storage medium as recited in claim 9, wherein obtaining cluster and virtual machine configuration information comprises selecting a proxy node of the cluster environment on which restoration of the virtual machine will be performed.

11. The non-transitory storage medium as recited in claim 9, wherein the cluster and virtual machine configuration information are obtained from an agent that resides on a cluster aliasing node.

12. The non-transitory storage medium as recited in claim 9, wherein the restore request is sent from a remote client outside the cluster environment to a backup and restore server outside the cluster environment.

13. The non-transitory storage medium as recited in claim 9, wherein one or more of the operations are performed by a recover program spawned, and residing, on an aliasing node.

14. The non-transitory storage medium as recited in claim 9, wherein the operations further comprise identifying a file to be restored.

15. The non-transitory storage medium as recited in claim 9, wherein the operations further comprise bringing virtual machine configuration resources online along with the restored virtual machine.

16. The non-transitory storage medium as recited in claim 9, wherein the operations further comprise migrating the restored virtual machine to another node.

* * * * *